United States Patent
Biswas (10) Patent No.: US 9,262,645 B2
(45) Date of Patent: Feb. 16, 2016

(54) METHOD AND APPARATUS FOR PRIVACY POLICY MANAGEMENT

(75) Inventor: Debmalya Biswas, Lausanne (CH)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/240,394

(22) PCT Filed: Aug. 31, 2011

(86) PCT No.: PCT/IB2011/053821
§ 371 (c)(1),
(2), (4) Date: Feb. 22, 2014

(87) PCT Pub. No.: WO2013/030626
PCT Pub. Date: Mar. 7, 2013

(65) Prior Publication Data
US 2014/0259096 A1    Sep. 11, 2014

(51) Int. Cl.
*H04L 29/06* (2006.01)
*G06F 21/62* (2013.01)
*H04W 12/02* (2009.01)
*H04W 8/18* (2009.01)

(52) U.S. Cl.
CPC ............ *G06F 21/6218* (2013.01); *H04W 8/18* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 8,656,465 B1 * | 2/2014 | Fong-Jones | 726/5 |
| 8,862,356 B2 | 10/2014 | Miller | 701/70 |
| 8,886,460 B1 * | 11/2014 | Keoshkerian | 701/533 |
| 2004/0176104 A1 | 9/2004 | Arcens | |
| 2007/0271379 A1 | 11/2007 | Carlton et al. | |
| 2009/0300716 A1 * | 12/2009 | Ahn | 726/1 |
| 2010/0077484 A1 | 3/2010 | Paretti et al. | |
| 2010/0235877 A1 | 9/2010 | Hu et al. | |
| 2011/0078758 A1 * | 3/2011 | Kohlenberg et al. | 726/1 |
| 2013/0174211 A1 * | 7/2013 | Aad et al. | 726/1 |
| 2014/0040979 A1 * | 2/2014 | Barton et al. | 726/1 |

FOREIGN PATENT DOCUMENTS

WO    2011018937    2/2011

OTHER PUBLICATIONS

International Search Report and Written Opinion received for corresponding Patent Cooperation Treaty Application No. PCT/IB2011/053821, dated Jun. 5, 2012, 16 pages.

(Continued)

*Primary Examiner* — Kaveh Abrishamkar
(74) *Attorney, Agent, or Firm* — Mintz Levin Cohn Ferris Glovsky and Popeo, P.C.

(57) ABSTRACT

Various methods are provided for determining run-time characteristics of an application at the time of installation and/or modification. Based on the determined run time characteristics, various methods control the installation and/or modification of the application based on a user privacy profile. One example method may comprise receiving a request to modify an application. A method may further comprise determining whether a conflict is present between the application and a user privacy profile. A method may further comprise causing the determined conflict and at least one conflict resolution to be displayed in an instance in which a conflict is determined. A method additionally comprises causing a user privacy profile to be modified in an instance in which an indication of acceptance is received in response to the displayed at least one conflict resolution.

17 Claims, 3 Drawing Sheets

(56) References Cited

OTHER PUBLICATIONS

Dan Hong et al. "Dynamic privacy management: a plug-in service for the middleware in pervasive computing", Conference Proceeding: Jan. 2005; In proceeding of Proceedings of the 7th Conference on Human-Computer Interaction with Mobile Devices and Services, Mobile HCI 2005, 2005, Salzburg, Austria, Sep. 19-22, 2005.
David Basin et al."Monitoring security policies with metric first-order temporal logic", SACMAT' 10 Proceedings of the 15th ACM symposium on Access control models and technologies. pp. 23-34.
Eldin et a. "A Privacy Preferences Architecture for Context Aware Applications", IEEE International Conference on Computer Systems and Applications 2006, pp. 1110-1113.
IBM Corporation, "Method for location based privacy using meta data and parameter driven dynamic rules", Research Disclosure, Mason Publications, Hampshire, GB, PD-2002-04-01, PAN-456099.
3GPP TS 22.071 V10.0.0 (Mar. 2011), 3rd Generation Partnership Project; Technical Specification Group Services and System Aspects; Location Services (LCS); Service description; Stage 1 (release 10)/. 3GPP S1-030498, draft TR22.xyx V0.10.
Bonazzi et al. "Business model considerations for privacy protection in a mobile location based context", Intelligence in Next Generation Networks (ICIN), 2010 14th International Conference Oct. 11-14, 2010, vol. No. pp. 1-8.
Zhou et al., "Taming Information-Stealing Smartphone Applications (on Android)", Proceedings of the 4th international conference on Trust and trustworthy computing, 2011, 15 pages.
Nachenberg, "A Window Into Mobile Device Security", Examining the security approaches employed in Apple's iOS and Google's Android, Symantec Security Response, 2011, 23 pages.
"Windows Phone 7 Security Model", Windows Phone 7 for IT professionals, Microsoft, Dec. 2010, 4 pages.
Enck et al., "TaintDroid: An Information-Flow Tracking System for Realtime Privacy Monitoring on Smartphones", Proceedings of the 9th USENIX conference on Operating Systems Design and Implementation (OSDI), 2010, 15 pages.
Biswas, "Privacy Policies Change Management for Smartphones", IEEE International Conference on Pervasive Computing and Communications Workshops, Mar. 19-23, 2012, 9 pages.
Reshetova et al., "Mobile Simplified Security Framework Overview", In proceedings of the MeeGo Conference, 2010.

* cited by examiner

METHOD AND APPARATUS FOR PRIVACY POLICY MANAGEMENT

RELATED APPLICATION

This application was originally filed as PCT Application No. PCT/IB2011/053821 filed Aug. 31, 2011.

TECHNOLOGICAL FIELD

Embodiments of the present invention relate generally to privacy policy management technology and, more particularly, relate to a method, apparatus, and computer program product for application management according to a privacy policy.

BACKGROUND

Applications (apps) are arguably the lifeline of today's mobile terminals. Their immense popularity is evident from the thousands of available apps. One reason applications are so popular and useful is because they provide services highly customized to different aspects of life, from recommending location based places of interest to monitoring health. One downside is that to provide such services, the applications collect personal information about the user. This personal information is generally monitored by the many hardware and logical sensors present in mobiles phones. These sensors include, but are not limited to, global positioning system (GPS) sensors, accelerometers, and/or the like. Such personal information is very sensitive and has grave privacy implications if misused.

To avoid such personal data misuse, most operating systems for mobile terminals provide a needs-based access control model where access to data collected by a sensor is only given to an application after explicit authorization by the user. At a high level, applications declare a list of sensors to which they need access (to provide their functionality) in a manifest file. Then during installation, the manifest file is read and the list of required sensors is presented to the user. In other examples, the application may only be installed if the user agrees to the requested sensor access. After installation, the mobile operating system provides the needed access control to ensure that the application is only allowed access to those sensors as declared in its manifest file.

While the manifest file and the mobile operating system access restrictions act as a deterrent, studies have shown that such a model is not sufficient by itself. Many applications have been observed to misuse the install-time access given to them at run-time. For example, while a weather application may request legitimate access to the user's location after installation, there would be nothing stopping that weather application from retrieving the user's location every few seconds and feeding it to an external server at run time. Therefore without the ability to express and control run-time characteristics of the application, such as the frequency of access, a user's privacy may be at risk.

BRIEF SUMMARY

Methods, apparatuses, and computer program products are provided herein for determining run-time characteristics of an application at the time of installation and/or modification. Based on the determined run-time characteristics, the installation and/or modification of the application may be rejected by a user privacy profile. For example, if a user privacy profile only allows location information to be shared with an application at startup, then an example weather application that determines a location at startup would be permissible, whereas an example weather application that requests unbounded access to a user's location would be rejected, and thus not installed.

A method as described herein may include receiving a request to modify an application. A method may further include determining whether a conflict is present between the application and a user privacy profile. A method may further include causing the determined conflict and at least one conflict resolution to be displayed in an instance in which a conflict is determined. A method additionally includes causing a user privacy profile to be modified in an instance in which an indication of acceptance is received in response to the displayed at least one conflict resolution.

In another embodiment, an apparatus comprising a processor and a memory including software, with the memory and the software configured to, with the processor, cause the apparatus at least to receive a request to modify an application. The apparatus is further caused to determine whether a conflict is present between the application and a user privacy profile. The apparatus is further caused to determine at least one conflict and at least one conflict resolution to be displayed in an instance in which a conflict is determined. The apparatus is further caused to cause a user privacy profile to be modified in an instance in which an indication of acceptance is received in response to the displayed at least one conflict resolution.

In a further embodiment, a computer program product is provided that comprises at least one computer readable non-transitory memory having program code stored thereon with the program code which when executed by an apparatus causing the apparatus at least to receive a request to modify an application. A computer program product also comprises program code that is further configured to determine whether a conflict is present between the application and a user privacy profile. A computer program product also comprises program code that is further configured to cause the determined conflict and at least one conflict resolution to be displayed in an instance in which a conflict is determined. A computer program product also comprises program code that is further configured to cause a user privacy profile to be modified in an instance in which an indication of acceptance is received in response to the displayed at least one conflict resolution.

In yet another embodiment, an apparatus is provided that comprises means for receiving a request to modify an application. An apparatus further comprises means for determining whether a conflict is present between the application and a user privacy profile. An apparatus further comprises means for causing the determined conflict and at least one conflict resolution to be displayed in an instance in which a conflict is determined. An apparatus further comprises means for causing a user privacy profile to be modified in an instance in which an indication of acceptance is received in response to the displayed at least one conflict resolution.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device.

In an example embodiment, an application may be configured to request, at the time of modification (e.g., installation, update, upgrade and/or the like), the use of a sensor (e.g., GPS, accelerometer and/or the like) or a sequence of sensors on a mobile terminal. In response, an example embodiment may compare the requested sensors or the requested sequence of sensors with a user privacy profile. In an instance in which the requested sensors or the sequence of sensors are determined to match at least a subsequence of sensors in the user privacy profile, then the application modification may be allowed.

In an instance in which there is not a match between the sensors or the sequence of sensors and at least a subsequence of sensors in the user profile, then example embodiments may be configured to provide a resolution that enables a user, an operating system, and/or the like to determine whether to modify a user privacy profile to allow modification of the application. In an instance in which the user policy is not modified, then the application modification is rejected.

In example embodiments, applications (e.g., both installed and rejected) are analyzed in an instance in which a user privacy profile is modified. For example, example embodiments may store a list of rejected applications and then in an instance in which the user privacy profile is modified, the list of previous rejected applications may be analyzed to determine if they would now be permitted to be installed based on the modified user privacy profile. As a further example, example embodiments may be configured to determine whether applications that are currently installed are still permitted based on the modified user privacy profile.

Figure 1:
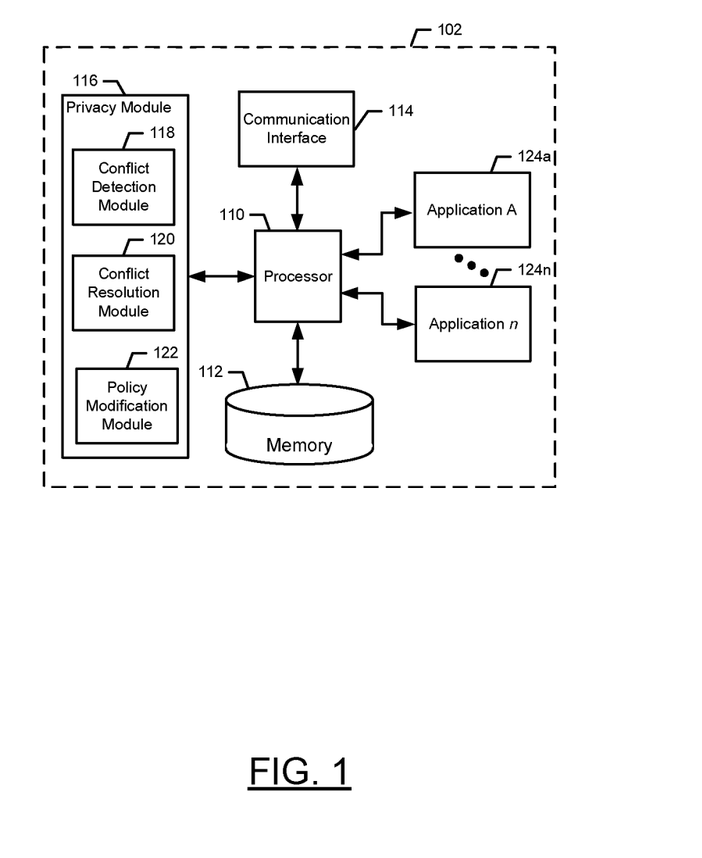
FIG. 1 illustrates a block diagram of a privacy policy system for comparing an application to a user privacy profile in an example embodiment of the present invention.

FIG. 1 illustrates a block diagram of a privacy policy system 102 for comparing an application to a user privacy profile in an example embodiment of the present invention. It will be appreciated that the privacy policy system 102 is provided as an example of an embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating a privacy policy system other configurations may also be used to implement embodiments of the present invention.

The privacy policy system 102 may be embodied as a desktop computer, laptop computer, mobile terminal, tablet, mobile computer, mobile phone, mobile communication device, one or more servers, one or more network nodes, game device, digital camera/camcorder, audio/video player, television device, radio receiver, digital video recorder, positioning device, any combination thereof, and/or the like. In an example embodiment, the privacy policy system 102 is embodied as a mobile terminal, such as that illustrated in FIG. 2.

Figure 2:
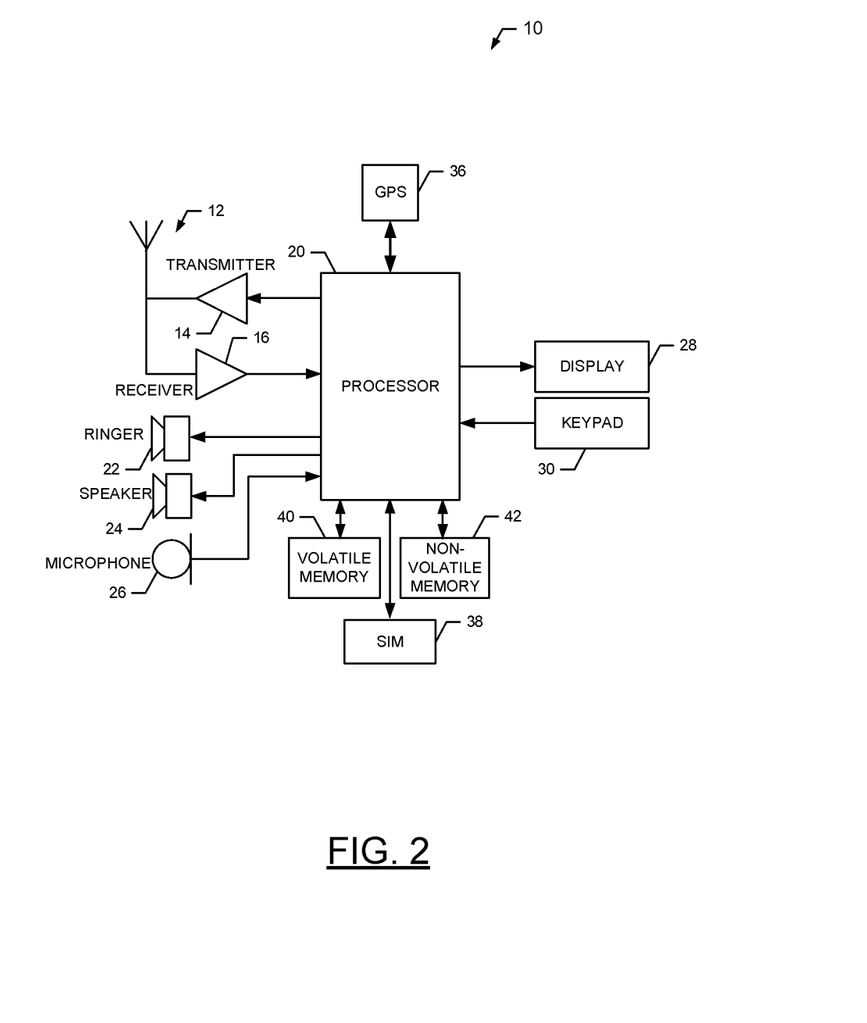
FIG. 2 is a schematic block diagram of a mobile terminal according to an example embodiment of the present invention.

In this regard, FIG. 2 illustrates a block diagram of a mobile terminal 10 representative of one embodiment of a privacy policy system 102. It should be understood, however, that the mobile terminal 10 illustrated and hereinafter described is merely illustrative of one type of privacy policy system 102 that may implement and/or benefit from embodiments of the present invention and, therefore, should not be taken to limit the scope of the present invention. While several embodiments of the user terminal (e.g., mobile terminal 10) are illustrated and will be hereinafter described for purposes of example, other types of user terminals, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal 10 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal 10 may be allocated between these devices according to their respective capabilities. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). The mobile terminal 10 may comprise sensors, such as a GPS 36, which may determine location information for the user. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

The mobile terminal 10 may comprise memory, such as a smart cart, subscriber identity module or subscriber identification module (SIM), a removable user identity module (R-UIM), and/or the like, which may store information elements related to a mobile subscriber. In addition to the SIM, the mobile terminal may comprise other removable and/or fixed memory. The mobile terminal 10 may include other non-transitory memory, such as volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the privacy policy system 102 includes various means for performing the various functions herein described. These means may comprise one or more of a processor 110, memory 112, communication interface 114, privacy module 116, and/or applications 124a-n. The means of the privacy policy system 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In an example embodiment, components/modules of the privacy policy system 102 are implemented using standard programming techniques. For example, the privacy policy system 102 may be implemented as a "native" executable running on the CPU 403, along with one or more static or dynamic libraries. In other embodiments, the privacy policy system 102 may be implemented as instructions processed by a virtual machine that executes as another program. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the privacy policy system 102 can be made available by standard mechanisms such as through C, C++, C#, and Java APIs; libraries for accessing files, databases, or other data repositories; through languages such as XML; or through Web servers, FTP servers, or other types of servers providing access to stored data.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the privacy policy system 102 as described herein. The plurality of processors may be embodied on a single computing device or distributed across a plurality of computing devices collectively configured to function as the privacy policy system 102. In embodiments wherein the privacy policy system 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the privacy policy system 102 to perform one or more of the functionalities of the privacy policy system 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, non-transitory memory, such as volatile memory, non-volatile memory, or some combination thereof. Although illustrated in FIG. 1 as a single memory, the memory 112 may comprise a plurality of memories. The plurality of memories may be embodied on a single computing device or may be distributed across a plurality of computing devices collectively configured to function as the privacy policy system 102. In various example embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the privacy policy system 102 is embodied as a mobile terminal 10, the memory 112 may comprise the volatile memory 40 and/or the non-volatile memory 42. The memory 112 may be configured to store information, data, applications, instructions, or the like for enabling the privacy policy system 102 to carry out various functions in accordance with various example embodiments.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data to/from another computing device. For example, the communication interface 114 may be configured to receive application data over a network.

The privacy module 116 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the privacy module 116 is embodied separately from the processor 110, the privacy module 116 may be in communication with the processor 110. The privacy module 116 may further be in communication with one or more of the memory 112, communication interface 114, and/or the applications 124*a-n*, such as via a bus.

In embodiments of the present invention, the privacy module 116 may be configured to compare one or more requested sensors, sensor sequences, sensor frequencies, sensor intervals and/or the like in an application, such as applications 124a-n, with a user privacy profile. In an embodiment, a series of variables are used to specify the one or more sensor sequences requested and/or used by an application and the series of variables are also used to express a user privacy profile. In an embodiment, the series of variables may be expressed as a privacy policy language.

In an embodiment of the privacy policy language, a mobile terminal's sensors may be represented as sensor predicates e.g., sens($s_i$, f, sT, eT, r, L). In the example privacy policy language, the variable $s_i$ may be used to identify a particular sensor. The variable f may be used to represent the frequency of invocation of a particular sensor. In alternate embodiments, the variable f may be set as −1 to represent an ad hoc or needs based invocation pattern. For example an on-click invocation and/or the like.

The example privacy policy language may include variables that represent a start time sT and end time eT, which may represent a time during which a sensor would be invoked by the application. The example variable r may denote a recurrence pattern for a start and end time for a sensor e.g. hourly, daily, and monthly, etc. The example variable L may be configured to contain a set of locations where a sensor may be invoked. A location may include a broad as a list of cities, countries, etc. to more semantic ones e.g. office, home, restaurant, etc.

In an embodiment, a fragment of Metric Temporal First Order Logic (MFOTL) may be used to define the grammar for a sequence of sensor invocations. An example sensor invocation is as follows:

$$\emptyset_s ::= \text{sens}(s_i, f, sT, eT, r, L) | (\emptyset_s \land \emptyset_s) | (\bullet_I \emptyset_s) | (\circ_I \emptyset_s) | (\emptyset_s S_I \emptyset_s) | (\emptyset_s U_I \emptyset_s)$$

In this example sensor invocation $s_i \in S$ refers to the set of available sensors and I may denote the time interval [a, b] with a≤b in an example gradually increasing finite time domain. In this example, standard conventions are used to omit parentheses; example standard conventions include, but are not limited to temporal operators that may bind weaker than boolean connectives. Furthermore, in an example embodiment, operators are defined $\blacklozenge_I \theta := \text{true } S_I \theta$ (once), $\blacksquare_I \theta := \neg \blacklozenge_I \neg \theta$ (always in the past), $\lozenge_I \theta := \text{true } U_I \theta$ (eventually), and $\square_I \theta := \neg \lozenge_I \neg \theta$ (always), where $I \in \mathbb{I}$.

In an example embodiment, a unary temporal operator is considered. The example sensor invocation is further configured to specify a sequence of sensor invocations but may also indicate the time interval between subsequent invocations. For example, the sequential invocation of three sensors $s_1$, $s_2$, $s_3$, $s_2$ in the next 30 mins after $s_1$'s invocation, followed by $s_3$ within the next 40 mins can be specified as follows:

$$\emptyset_s ::= \text{sens}(s_1, f_1, \ldots) \land \lozenge_{[0,30]} \text{sens}(s_2, f_2, \ldots) \land \lozenge_{[30,70]} \text{sens}(s_3, f_3, \ldots)$$

The example sensor invocation may also be used to denote simultaneous invocations (e.g., setting the time intervals to [0,0]) and/or simply that a group of sensors needs to be invoked in an ad-hoc manner (e.g., using only logical AND without time intervals).

Returning to the privacy module 116, in an example embodiment, a privacy module 116 may include various means for performing the various functions described herein. These means may comprise one or more of a conflict detection module 118, a conflict resolution module 120 and/or a policy modification module 122. The means of the privacy module 116 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In embodiments of the present invention, the conflict detection module 118 may be configured to detect conflicts between a user profile and an application, such as applications 124a-n. As described herein, a conflict is defined as any disagreement, contradiction, variation, opposition, clash and/or the lack between one or more sensors, a sequence of sensors, a frequency, timing, interval that sensors may be used, a location when a sensor is activated and/or the like. The user profile may be stored in the memory 112 or may be accessible from a remote storage (not shown) using the communications interface 114. Based on a series of variables, described as a policy language, such as the privacy policy language, a user privacy profile $u_p$ may be defined as a set of permitted sensor invocation sequences for example: $u_p ::= (\emptyset_{u1} \lor \emptyset_{u2} \lor \ldots)$. In an embodiment, there may be one or more sensor invocations sequences established by a user for the same sensors or same group of sensors. An application may have a similar list of sensor invocations sequences. Such sequences may define the sensors the application may need to provide its functionality, for example: $a_p ::= (\emptyset_{a1} \land \emptyset_{a2} \land \ldots)$.

In an embodiment, the conflict detection module 118 may be configured to detect conflicts between $u_p$ and $a_p$ in an instance in which an application is being modified on a mobile terminal. To detect conflicts between an application at run-time and a user profile, the conflict detection module 118 may be configured, for example, to detect conflicts with the sensors requested by the application, the sequences in which the sensors may be invoked by the application, sequence interval constraints of the sensor, and/or parameter conflicts corresponding to sensor invocation with respect to how a sensor may be accessed.

In an embodiment, the conflict detection module 118 may be further configured to determine whether a sensor sequence in the application, when executed at run-time, is at least a subsequence of a sensor sequence in the user privacy profile. For example, a subsequence may be defined based on sequences $\emptyset_{f1}$ and $\emptyset_{f2}$. In this example, let $\emptyset'_{f1}$ and $\emptyset'_{f2}$ denote corresponding transformed sequences retaining sensor identifier $s_i$ as a parameter of the sensor predicates. Then $\emptyset_{f1}$ is a subsequence of $\emptyset_{f2}$ in an instance in which $\emptyset'_{f1}$ is a fragment of $\emptyset'_{f2}$. For example $\emptyset'_{f2} ::= \text{sens}(s_i, \ldots) \land \ldots \land \emptyset'_{f1} \land \ldots$. Analogously, $\emptyset_{f2}$ is a supersequence of $\emptyset_{f1}$.

The conflict detection module 118 may be configured to determine for each sensor sequence $\emptyset_{aP}$ in the application, an instance in which $\emptyset_{aP}$ is at least a subsequence of at least one sequence $\emptyset_{uP}$ in the user profile. Such instances form at least one sub-supersequence pair $\emptyset_{aP}$–$\emptyset_{uP}$. In an instance in which a sensor sequence in the application is not at least a subsequence of a sensor sequence in the user profile, then there is a conflict.

In an embodiment, a conflict resolution module 120, is configured to provide one or more recommendations to resolve a potential conflict. For each conflict, the conflict resolution module 120 is configured to cause an explanation of the conflict and possible resolutions of the conflict to be displayed. For example, suggestions for modifying a user profile may be provided. Alternatively or additionally, the conflict resolution module 120 may be configured to provide feedback to an application manufacturer.

In an embodiment, a conflict resolution module 120 detects a conflict between the sequences of sensors in an application and a user profile. The conflict resolution module may be configured to provide an explanation of the conflict and determine a resolution. For example, a conflict may occur because an example sensor $s_i$, required by an application does not exist in a user profile. In response, the conflict resolution module may determine the largest set of sensors s such that $s \subset S(\phi_{aP})$ and $s \subset S(\phi_{uP})$, where $S(\phi)$ refers to the set of sensors $\{s_i | sens(s_i, \ldots) \text{ in } \phi\}$. The conflict resolution module 120 may determine an example explanation and resolution as provided below, other explanations and resolutions may be provided in alternate embodiments:

$|s|=S(\phi_{aP}))|$: [Example Explanation] A supersequence $\phi_{uP}$ containing the required set of sensors exists, but the invocation pattern and/or sequence is different. [Example Resolution] Adapt the sequence $\phi_{uP}$ accordingly.

$|s|<S(\phi_{aP}))|$: [Example Explanation] The subset of sensors $s'=S(\phi_{aP})\backslash s$ is not permitted by the user. [Example Resolution] Add the subset of sensors s' and adapt the sequence $\phi_{uP}$ accordingly.

$|s|=0$: [Example Explanation] Access requested for a completely novel set of sensors. [Example Resolution] Add the requested sequence $\phi_{aP}$ to the user privacy policy (e.g. allow the sensor invocation pattern $\phi_{aP}$).

In an embodiment, a conflict resolution module 120 detects a conflict between a sequence interval of sensors in an application and in a user profile. The conflict resolution module 120 may alternatively receive an indication of a conflict from the conflict detection module 118. In response, the conflict resolution module 120 may provide an explanation, such as for an example sensor sequence $\phi_{aP}$ in an application, there exists a supersequence $\phi_{uP}$ in the user privacy profile, but the intervals among subsequent sensor invocations do not match. A possible resolution may include allowing $t_a = \diamond_{[a,b]}$ and $t_u = \diamond_{[c,d]}$ to denote the potential mismatched intervals and b>d (a<c). In an embodiment, a possible resolution may also include increasing the upper limit d or decreasing the lower limit a. Alternatively or additionally increasing b may implicitly increase the 'absolute' time intervals of all following and/or preceding sensor predicates in $\phi_{uP}$ such that an increase and/or decrease may also need to be validated in the scope of the whole sequence $\phi_{uP}$ as well.

In an embodiment, a conflict resolution module 120 detects a conflict between a sensor frequency or location in which a sensor is activated in an application and a user privacy profile. An example explanation may be provided, such as parameter mismatches between sensor predicates $sens(s_i, f_i, \ldots, L_i)$ and $sens(s_j=s_i, f_j>f_i, \ldots, L_j \supset L_i)$ in $\phi_{aP}$ and its supersequence $\phi_{uP}$ respectively. A possible resolution may include allowing increased frequency of accessing sensor $s_i$, i.e. decrease $f_j$ and/or adding a subset of locations $L_i \backslash L_j$ to $L_j$.

In an embodiment, a conflict resolution module 120 detects a conflict between timings of sensors in an application and a user privacy profile. An example explanation may be provided, such as an explanation demonstrating conflicts with respect to the timings when a sensor can be accessed to retrieve its data. A possible resolution may include for, example, resolving conflicts in recurrence (r) and timing (sT, eT) patterns in a similar manner as described above with respect to frequency and locations.

In an embodiment, a policy modification module 122, is configured to be triggered in an instance in which a user policy is changed. For example, for any change in a user privacy policy, the sensor requirements for an installed application may need to be analyzed as described herein with reference to the conflict detection module 118. Additionally or alternatively, the policy modification module may be configured to reevaluate previously rejected applications to determine if the user policy change may alter a previous rejection decision.

In an embodiment, a policy modification module 122, is configured to maintain a log of installed applications and/or a log of rejected applications. The log of rejected applications may further include a conflict type that led to the rejections, such as those conflicts described with reference to the conflict detection module 118.

The policy modification module 122, may be further configured to classify a modification of a user profile as relax, restrict and/or general. A modification may be characterized as relax in an instance in which a new sensor sequence is added to a user privacy policy. For example, a sequence $\phi_{uP}$ may be determined to be relaxed if access to a new sensor is allowed by, for example, adding the corresponding sensor predicate at the beginning or end of sequence $\phi_{uP}$. A modification may be characterized as restricting in an instance in which an entire sequence $\phi_{uP}$ is deleted and/or a sensor predicate $sens(s, \ldots)$ is deleted from $\phi_{uP}$ (e.g., revoking access to a particular sensor s). A modification may be characterized as general in an instance in which a sensor predicate $sens(s, \ldots)$ is moved to the middle of $\phi_{uP}$. For example, adding a sensor predicate to the middle may have characteristics of both relaxing and restricting.

For example, with respect to the various conflicts described herein, the policy module 122 may provide the following actions in response to a modification to a user privacy profile. For example, if a sequence of sensors is modified in a user privacy profile, a user privacy policy may be determined to be relaxed in an instance in which a new sequence is added to the user profile. In addition, a user profile sequence $\phi_{uP}$ in a user profile may be relaxed in an instance in which a new sensor is allowed and/or a corresponding sensor predicate is added at the beginning or end of a sequence $\phi_{uP}$. A user privacy profile may also be relaxed in an instance in which the upper limit of b is increased or the lower limit a is decreased in the sensor sequence interval, such as sequence interval $t_u = \diamond_{[a,b]}$. A user privacy profile may also be relaxed in an instance in which a novel location $l_k \notin L_i$ is added to $L_i$ in example sensor predicate $sens(s_j, \ldots, L_j)$ in $\phi_{uP}$. A user privacy profile may also be relaxed in an instance in which a recurrence pattern $r_j$ is lowered such as from 'monthly' to 'daily' and/or the allowed end-time $eT_j$ is increased or the allowed start-time $sT_j$ is decreased in the example sensor predicate $sens(s_j, f_j, sT_j, eT_j, r_j, \ldots)$ in $\phi_{uP}$.

In an embodiment, the policy module 122 may provide the following actions in response to a modification to a user privacy profile. For example if, a sequence of applications is modified in a user privacy profile, a user privacy policy may be determined to be restricted in an instance in which an entire sequence $\phi_{uP}$ is deleted from and/or a sensor predicate $sens(s, \ldots)$ is deleted from $\phi_{uP}$ thereby revoking access to a sensor. A user privacy policy may also be determined to be restricted in an instance in which a is increased or b is decreased. A user privacy policy may also be determined to be restricted in an instance in which $f_j$ is increased, a location $l_k \in L_i$ is deleted from $L_i$, and/or a recurrence pattern $r_j$ is increased and the allowed end-time $eT_j$ is decreased or the allowed start-time $sT_j$ is increased.

In an embodiment, the policy module 122 may provide the following actions in response to a modification to a user privacy profile. For example, if a sequence of applications is modified in a user privacy profile, a user privacy policy may be determined to be general in an instance in which a sensor predicate $sens(s, \ldots)$ is added to $\phi_{uP}$, other than at the beginning or end of $\phi_{up}$ and/or lowering the recurrence pattern $r_j$, but decreasing the allowed end-time $eT_j$ or increasing the allowed start-time $sT_j$.

The policy modification module 122, may be further configured to analyze rejected applications in an instance in which a user profile change is classified as relax. However because the user profile change was classified as relaxed, generally currently installed applications need not be checked because they were compliant with the previous more restrictive profile and thus would be compliant with a relaxed profile. In contrast, in an instance in which a user profile change is classified as restrict, installed applications would be checked for compliance and the previously rejected applications would not be checked because the current user privacy policy is more restrictive then the user privacy policy at the time of the rejection. In an instance in which a user profile change is classified as general, then both the installed and rejected applications are analyzed.

Figure 3:
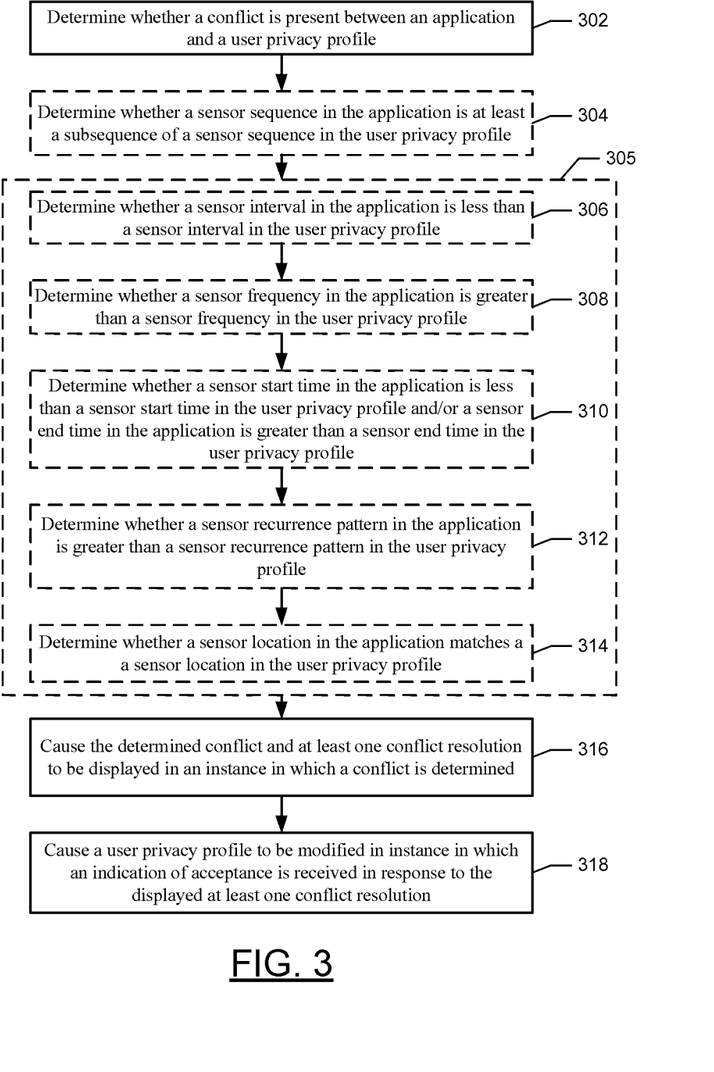
FIG. 3 illustrates a flowchart according to an example method for comparing an application to a user privacy profile according to an example embodiment of the invention.

FIG. 3 illustrates an example flowchart of the operations performed by an apparatus, such as apparatus 102 of FIG. 1, in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 112 of an apparatus employing an embodiment of the present invention and executed by a processor 110 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 3, when executed, convert a computer or processing circuitry into a particular machine configured to perform an example embodiment of the present invention. Accordingly, the operations of FIG. 3 define an algorithm for configuring a computer or processing 112, to perform an example embodiment. In some cases, a general purpose computer may be provided with an instance of the processor which performs the algorithm of FIG. 3 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included (some examples of which are shown in dashed lines in FIG. 3). It should be appreciated that each of the modifications, optional additions or amplifications below may be included with the operations above either alone or in combination with any others among the features described herein.

FIG. 3 illustrates a flowchart according to an example method for comparing an application to a user privacy profile according to an example embodiment of the invention. As shown in operation 302, the apparatus 102 embodied, for example, by a mobile terminal 10, may include means, such as the processor 110, the privacy module 116, the conflict detection module 118, or the like, for determining whether a conflict is present between an application and a user privacy profile. For example a conflict may be detected based on conflicts with the sensors requested by the application, the sequences in which the sensors may be invoked, sequence interval constrains, and/or parameter conflicts corresponding to sensor invocation with respect to how a sensor may be accessed.

As shown in operation 304, the apparatus 102 embodied, for example, by a mobile terminal 10, may include means, such as the processor 110, the privacy module 116, the conflict detection module 118, or the like, for determining whether a sensor sequence in the application is at least a subsequence of a sensor sequence in the user privacy profile. See for example, the description of the conflict detection module 118.

In an embodiment and as shown with respect to operation 305, the apparatus 102 embodied, for example, by a mobile terminal 10, may include means, such as the processor 110, the privacy module 116, the conflict detection module 118, or the like, for analyzing one or more sensor predicates in a sensor sequence as described with respect to operations 306-314.

As shown in operation 306, the apparatus 102 embodied, for example, by a mobile terminal 10, may include means, such as the processor 110, the privacy module 116, the conflict detection module 118, or the like, for determining whether a sensor interval in the application is less than a sensor interval in the user privacy profile. For example, the apparatus 102 embodied, for example, by a mobile terminal 10, may include means, such as the processor 110, the privacy module 116, the conflict detection module 118, or the like, for using the at least one subsequence pair, to determine an application sensor sequence interval in the sensor sequence of the application and to determine a user privacy profile sensor sequence interval in the determined sensor subsequence of the user privacy profile. In an instance in which the determined application sensor sequence is less than the determined user privacy profile sensor sequence interval, then the conflict detection module 118 may be configured to determine that a conflict is present. For example, for each sens($s_i$, ...) in an example predicate in $\phi_{ap}$ and the corresponding sens($s_j = s_i$, ...) in $\phi_{up}$, let $t_a = \diamond_{[a,b]}$ and $t_u = \diamond_{[c,d]}$ denote their respective temporal quantifiers. Given this, the apparatus 102 embodied, for example, by a mobile terminal 10, may include means, such as the processor 110, the privacy module 116, the conflict detection module 118, or the like may be configured to detect a conflict in an instance in which (a<c) and/or (b>d).

As shown in operation 308, the apparatus 102 embodied, for example, by a mobile terminal 10, may include means, such as the processor 110, the privacy module 116, the conflict detection module 118, or the like, for determining whether a sensor frequency in the application is greater than a sensor frequency in the user privacy profile. For example, the apparatus 102 embodied, for example, by a mobile terminal 10, may include means, such as the processor 110, the privacy module 116, the conflict detection module 118, or the like, for using the at least one subsequence pair, to determine an application sensor sequence frequency in the sensor sequence of the application and to determine a user privacy profile sensor sequence frequency in the determined sensor subsequence of the user privacy profile. In an instance in which the determined application sensor sequence frequency is greater than the determined user privacy profile sensor sequence frequency, then the apparatus 102 embodied, for example, by a mobile terminal 10, may include means, such as the processor 110, the privacy module 116, the conflict detection module 118, or the like may be configured to determine that a conflict is present. For example for each example sens($s_i$, $f_i$, . . . ) predicate in $\phi_{ap}$ and the corresponding example sens($s_j=s_i$, $f_j$, . . . ) in $\phi_{up}$, the conflict detection module 118 may be configured to detect a conflict in an instance in which $f_i>f_j$.

As shown in operation 310, the apparatus 102 embodied, for example, by a mobile terminal 10, may include means, such as the processor 110, the privacy module 116, the conflict detection module 118, or the like, for determining whether a sensor start time in the application is less than a sensor start time in the user privacy profile and/or a sensor end time in the application is greater than a sensor end time in the user privacy profile. For example, the apparatus 102 embodied, for example, by a mobile terminal 10, may include means, such as the processor 110, the privacy module 116, the conflict detection module 118, or the like, for using the at least one subsequence pair, to determine an application sensor sequence start time and an application sensor sequence end time in the sensor sequence of the application and to determine a user privacy profile sensor sequence start time and a user privacy profile sensor sequence end time in the determined sensor subsequence of the user privacy profile. In an instance in which at least one of the determined application sensor sequence start time is less than the determined user privacy profile sensor sequence start time and/or the determined application sensor sequence end time is greater than the determined user privacy profile sensor sequence end time, then the apparatus 102 embodied, for example, by a mobile terminal 10, may include means, such as the processor 110, the privacy module 116, the conflict detection module 118, or the like may be configured to determine that a conflict is present.

As shown in operation 312, the apparatus 102 embodied, for example, by a mobile terminal 10, may include means, such as the processor 110, the privacy module 116, the conflict detection module 118, or the like, for determining whether a sensor recurrence pattern in the application is greater than a sensor recurrence pattern in the user privacy profile. For example, the apparatus 102 embodied, for example, by a mobile terminal 10, may include means, such as the processor 110, the privacy module 116, the conflict detection module 118, or the like, for using the at least one subsequence pair, to determine an application sensor sequence recurrence pattern in the sensor sequence of the application and to determine a user privacy profile sensor sequence recurrence pattern in the determined sensor subsequence of the user privacy profile. In an instance in which the determined application sensor sequence recurrence pattern is greater than the determined user privacy profile sensor sequence recurrence pattern, then the conflict detection module 118 may be configured to determine that a conflict is present. For example, for each example sens($s_i$, $f_i$, $sT_i$, $eT_i$, $r_i$, $L_i$) predicate in $\phi_{ap}$ and the corresponding example sens($s_j=s_i$, $f_j$, $sT_j$, $eT_j$, $r_j$, $L_j$) in $\phi_{up}$, the apparatus 102 embodied, for example, by a mobile terminal 10, may include means, such as the processor 110, the privacy module 116, the conflict detection module 118, or the like may be configured to detect a conflict in an instance in which $r_i>r_j$, or if $r_i\leq r_j$ but $sT_i<st_j$ or $eT_i>et_j$. In an embodiment, comparing $r_i$ and $r_j$ assumes the existence of an ordered recurrence pattern ontology, such as daily, monthly, and/or the like.

As shown in operation 314, the apparatus 102 embodied, for example, by a mobile terminal 10, may include means, such as the processor 110, the privacy module 116, the conflict detection module 118, or the like, for determining whether a sensor location in the application matches a sensor location in the user privacy profile. For example, the apparatus 102 embodied, for example, by a mobile terminal 10, may include means, such as the processor 110, the privacy module 116, the conflict detection module 118, or the like, for using the at least one subsequence pair, to determine an application sensor sequence location in the sensor sequence of the application and to determine a user privacy profile sensor sequence location in the determined sensor subsequence of the user privacy profile; in an instance in which the determined application sensor sequence location is not equal to the determined user privacy profile sensor sequence location, then the conflict detection module 118 may be configured to determine that a conflict is present. For example, for each example sens($s_i$, . . . , $L_i$) predicate in $\phi_{ap}$ and the corresponding example sens($s_j=s_i$, . . . , $L_i$) in $\phi_{up}$, the apparatus 102 embodied, for example, by a mobile terminal 10, may include means, such as the processor 110, the privacy module 116, the conflict detection module 118, or the like may be configured to detect a conflict in an instance in which $L_i \subset L_j$.

As shown in operation 316, the apparatus 102 embodied, for example, by a mobile terminal 10, may include means, such as the processor 110, the privacy module 116, the conflict resolution module 120, or the like, for causing the determined conflict and at least one conflict resolution to be displayed in an instance in which a conflict is determined. For example, in an instance in which an application is rejected, multiple possible suggestions may be displayed, wherein each of the displayed suggestions when selected may be configured to cause a modification of the user privacy profile.

As shown in operation 318, the apparatus 102 embodied, for example, by a mobile terminal 10, may include means, such as the processor 110, the privacy module 116, the policy modification module 122, or the like, for causing a user privacy profile to be modified in an instance in which an indication of acceptance is received in response to the displayed at least one conflict resolution. For example, the user privacy profile may advantageously be modified based on the resolution as described with reference to operation 306, in such cases a policy modification module 122 may be activated.

Advantageously, the apparatus 102, method and computer program product as described herein enable a mobile terminal 10 to provide analysis of an applications run-time behavior at the time of modification and then further to detect if that run-time behavior conflicts with a user privacy policy. Further, privacy policies generally evolve over time and advantageously, the apparatus 102, method and computer program product as described herein enable analysis of currently installed applications and previously rejected applications with respect to a modified user privacy profile.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving a request to modify an application;
   determining a conflict is present between the application and a user privacy profile, when a sensor sequence in the application is at least a subsequence of the user privacy profile, wherein the determining the conflict is present includes at least:
      determining a first characteristic in the sensor sequence of the application;
      determining a second characteristic in the subsequence of the user privacy profile; and
      determining that the conflict is present based on at least a comparison of the first characteristic to the second characteristic;
   displaying the conflict and at least one conflict resolution; and
   causing the user privacy profile to be modified, when an indication of acceptance is received in response to the displayed conflict and at least one conflict resolution.

2. A method according to claim 1, wherein the first characteristic is a first interval in the sensor sequence of the application, wherein the second characteristic is a second interval in the subsequence of the user privacy profile, and wherein when the first interval is less than the second interval, the conflict is present.

3. A method according to claim 1, wherein the first characteristic is a first frequency in the sensor sequence of the application, wherein the second characteristic is a second frequency in the subsequence of the user privacy profile, and wherein when the first frequency is greater than the second frequency, the conflict is present.

4. A method according to claim 1, wherein the first characteristic includes a first start time and a first end time in the sensor sequence of the application, wherein the second characteristic includes a second start time and a second end time in the subsequence of the user privacy profile, and wherein when the first start time is earlier than the second start time, or the first end time is later than the second end time, the conflict is present.

5. A method according to claim 1, wherein the first characteristic is a first recurrence pattern in the sensor sequence of the application, wherein the second characteristic is a second recurrence pattern in the subsequence of the user privacy profile, and wherein when the first recurrence pattern is greater than the second recurrence pattern, the conflict is present.

6. A method according to claim 1, wherein the first characteristic is a first location in the sensor sequence of the application, wherein the second characteristic is a second location in the subsequence of the user privacy profile, and wherein when the first location is not the same as the second location, the conflict is present.

7. A method according to claim 1, further comprising:
   receiving an indication of a modified user privacy profile; and
   determining whether the conflict is present between the application and the modified user privacy profile.

8. A method according to claim 1, wherein when the application was previously rejected based on the user privacy profile, determining whether the conflict is present between the application and a modified user privacy profile.

9. A method according to claim 1, wherein the subsequence comprises a partial sequence of the user privacy profile.

10. An apparatus comprising a processor and a memory including software, the memory and the software configured to, with the processor, cause the apparatus to at least:
    receive a request to modify an application;
    determine a conflict is present between the application and a user privacy profile when a sensor sequence in the application is at least a subsequence of the user privacy profile, wherein the determining the conflict is present includes at least:
       determine a first characteristic in the sensor sequence of the application;
       determine a second characteristic in the subsequence of the user privacy profile; and
       determine that the conflict is present based on at least a comparison of the first characteristic to the second characteristic;
    display the conflict;
    and at least one conflict resolution; and
    cause the user privacy profile to be modified, when an indication of acceptance is received in response to the displayed conflict and at least one conflict resolution.

11. An apparatus according to claim 10, wherein the first characteristic is a first interval in the sensor sequence of the application, wherein the second characteristic is a second interval in the subsequence of the user privacy profile, and wherein when the first interval is less than the second interval, the conflict is present.

12. An apparatus according to claim 10, wherein the first characteristic is a first frequency in the sensor sequence of the application, wherein the second characteristic is a second frequency in the subsequence of the user privacy profile, and wherein when the first frequency is greater than the second frequency, the conflict is present.

13. An apparatus according to claim 10, wherein the first characteristic includes a first start time and a first end time in the sensor sequence of the application, wherein the second characteristic includes a second start time and second end time in the subsequence of the user privacy profile, and wherein when the first start time is earlier than the second start time, or the first end time is later than the second end time, the conflict is present.

14. An apparatus according to claim 10, wherein the first characteristic is a first recurrence pattern in the sensor sequence of the application, wherein the second characteristic is a second recurrence pattern in the subsequence of the user privacy profile, and wherein when the first recurrence pattern is greater than the second recurrence pattern, the conflict is present.

15. An apparatus according to claim 10, wherein the first characteristic is a first location in the sensor sequence of the application, wherein the second characteristic is a second location in the subsequence of the user privacy profile, and wherein when the first location is not the same as the second location, the conflict is present.

16. An apparatus according to claim 10, further caused to at least:
   receive an indication of a modified user privacy profile; and
   determine whether the conflict is present between an installed the application and the modified user privacy profile.

17. An apparatus according to claim 10, wherein when the application was previously rejected based on the user privacy profile, determine whether the conflict is present between the application and a modified user privacy profile.

\* \* \* \* \*